United States Patent
Jammet

(10) Patent No.: US 9,815,236 B2
(45) Date of Patent: Nov. 14, 2017

(54) METHOD FOR MANUFACTURING TUBES AND TUBE LIKELY TO BE OBTAINED BY SUCH A METHOD

(71) Applicant: ALBEA SERVICES, Gennevilliers (FR)

(72) Inventor: Jean-Claude Jammet, Amiens (FR)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 14/431,599

(22) PCT Filed: Sep. 25, 2013

(86) PCT No.: PCT/EP2013/069906
§ 371 (c)(1),
(2) Date: Mar. 26, 2015

(87) PCT Pub. No.: WO2014/048949
PCT Pub. Date: Apr. 3, 2014

(65) Prior Publication Data
US 2015/0239163 A1    Aug. 27, 2015

(30) Foreign Application Priority Data
Sep. 26, 2012 (FR) ..................... 12 59047

(51) Int. Cl.
*B29C 49/04* (2006.01)
*B29C 47/00* (2006.01)
(Continued)

(52) U.S. Cl.
CPC ........ *B29C 47/004* (2013.01); *B29C 47/0023* (2013.01); *B29C 47/0066* (2013.01);
(Continued)

(58) Field of Classification Search
None
See application file for complete search history.

(56) References Cited

U.S. PATENT DOCUMENTS 2,657,431 A * 11/1953 Slaughter .............. B29C 47/902
                                                    264/542
3,035,302 A *  5/1962 Lysobey ............. B29C 49/0015
                                                    264/542
(Continued)

FOREIGN PATENT DOCUMENTS

| DE | 834013 C | 3/1952 |
| DE | 19627805 A1 | 2/1997 |
| FR | 1354644 A | 3/1964 |
| GB | 969453 A | 9/1964 |

OTHER PUBLICATIONS

International Search Report mailed Nov. 4, 2013 (PCT/EP2013/069906); ISA/EP.

*Primary Examiner* — Jeffrey Wollschlager
(74) *Attorney, Agent, or Firm* — Banner & Witcoff, Ltd.

(57) ABSTRACT

The invention relates to a tube manufacturing method comprising steps of:
enclosing a parison (14) in a mold (6) to form a blank (15) having a first end portion shaped to form a first tube head, a tubular central portion, and a second end portion shaped to form a second tube head, and
cutting the tubular central portion (22) into a first skirt and a second skirt to obtain two separate tubes, namely a first tube including the first tube head and the first skirt, and a second tube including the second tube head and the second skirt.

12 Claims, 3 Drawing Sheets

Figure 1:
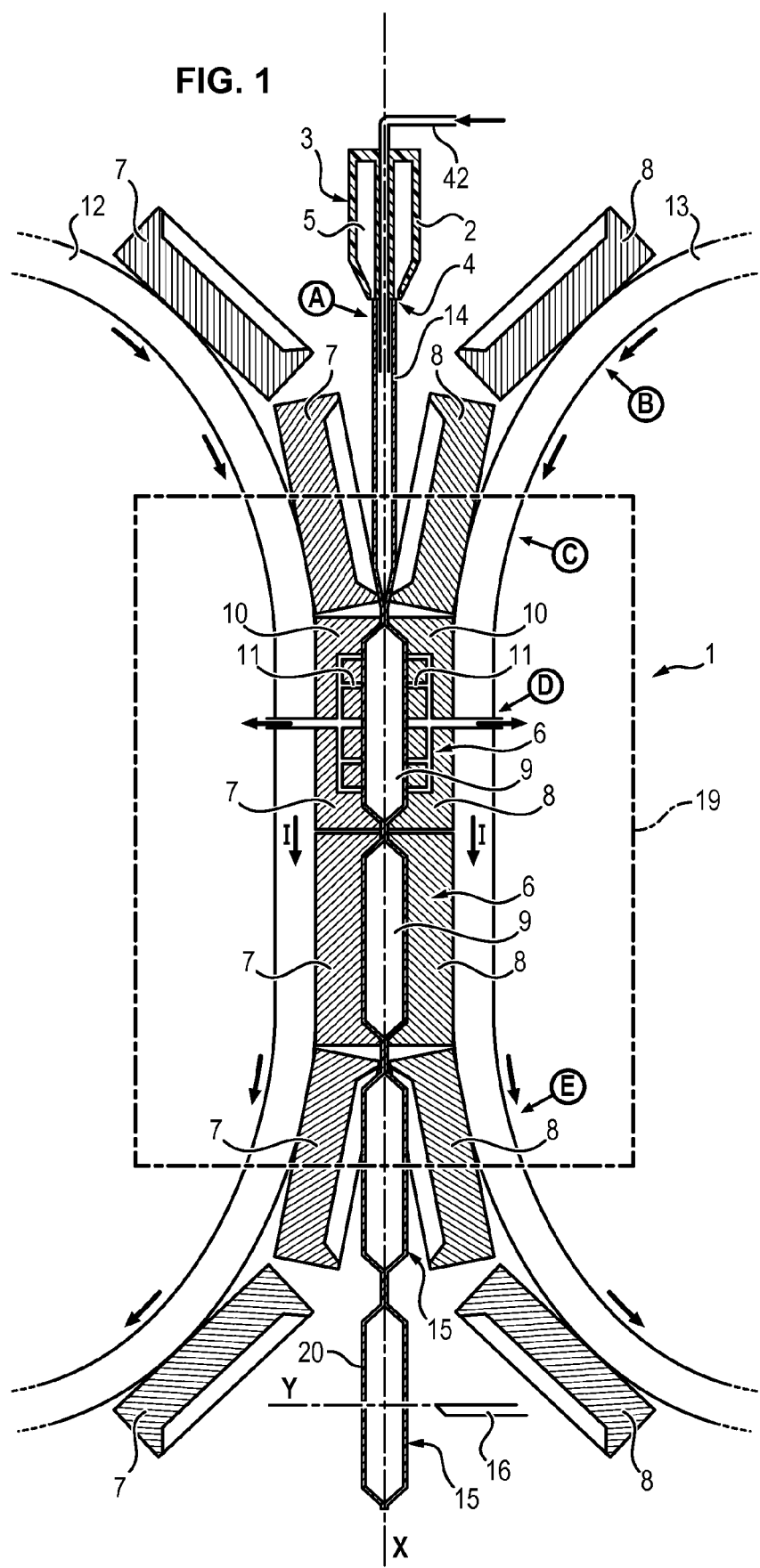

(51) Int. Cl.
- *B29C 49/22* (2006.01)
- *B29C 49/38* (2006.01)
- *B29C 49/50* (2006.01)
- *B29C 47/06* (2006.01)
- *B65D 35/10* (2006.01)
- *B29C 33/36* (2006.01)
- *B29C 49/00* (2006.01)
- *B29K 23/00* (2006.01)
- *B29L 23/20* (2006.01)

(52) U.S. Cl.
CPC ............ *B29C 47/065* (2013.01); *B29C 49/04* (2013.01); *B29C 49/22* (2013.01); *B29C 49/38* (2013.01); *B29C 49/50* (2013.01); *B65D 35/10* (2013.01); *B29C 33/36* (2013.01); *B29C 49/0021* (2013.01); *B29C 2793/009* (2013.01); *B29C 2793/0027* (2013.01); *B29K 2023/086* (2013.01); *B29K 2995/0067* (2013.01); *B29L 2023/20* (2013.01)

(56) References Cited

U.S. PATENT DOCUMENTS

| | | | | |
|---|---|---|---|---|
| 3,432,586 | A * | 3/1969 | Stenger | B29C 49/4278 215/40 |
| 3,711,233 | A * | 1/1973 | Uhlig | B29C 49/50 425/525 |
| 4,611,981 | A * | 9/1986 | English | B29C 49/14 264/532 |
| 5,046,877 | A * | 9/1991 | Longo | B65D 35/38 222/566 |
| 5,253,996 | A * | 10/1993 | Moore | B29C 49/4802 264/531 |
| 5,409,124 | A * | 4/1995 | Nasrallah | B29C 65/10 215/2 |
| 5,849,224 | A * | 12/1998 | Valyi | B29C 49/22 215/12.1 |
| 6,471,907 | B1 * | 10/2002 | Krall | B29C 49/34 264/509 |
| 2012/0031870 | A1 * | 2/2012 | Porter | B29B 11/08 215/40 |

* cited by examiner

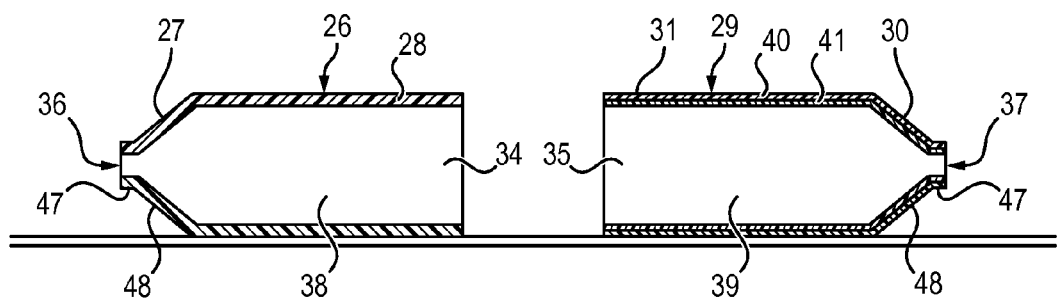
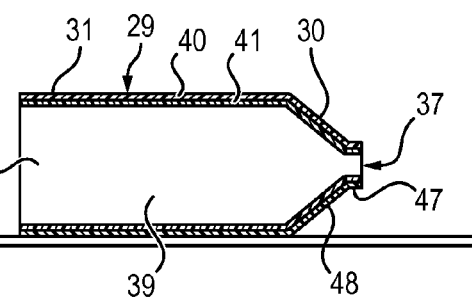
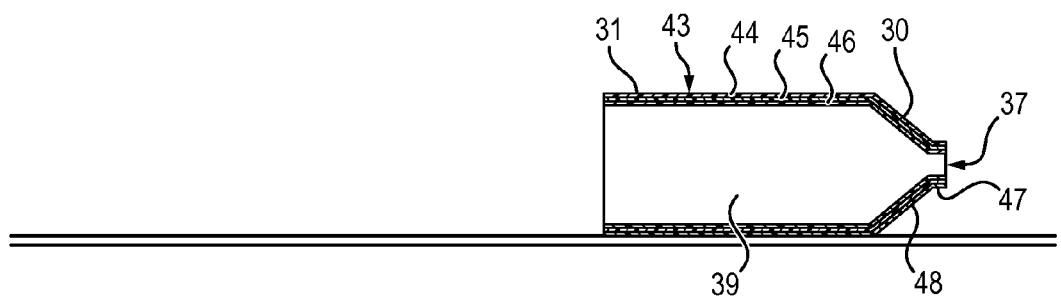

METHOD FOR MANUFACTURING TUBES AND TUBE LIKELY TO BE OBTAINED BY SUCH A METHOD

FIELD OF THE INVENTION

The invention relates to a tube manufacturing method and a tube capable of being obtained by such a method.

PRIOR ART

Tubes are known that are used to contain and dispense a liquid or paste product, such as for example a cosmetic or pharmaceutical product.

Said tubes generally comprise a head and a skirt. The skirt is made up of a flexible wall defining a cavity in which the cosmetic product is contained. The head comprises a neck having a dispensing orifice through which the product contained in the cavity can be extracted. The neck generally has threads or ribs making it possible to secure a cap or dispenser cap to the dispensing head, in order to close the dispensing orifice.

Two main techniques are used to manufacture said tubes.

A first technique consists of continuously extruding a plastics material in the form of a tubular preform known as a parison. Once it has cooled, the parison is cut into cylindrical lengths. The cylindrical lengths are then used to form tube skirts.

Each tube is then formed by arranging a tube skirt in a mould and overmoulding a tube head onto a border of the skirt, or by adding and welding a preformed tube head to the tube skirt.

The tube obtained is filled with product, the product being introduced into the cavity through the opening defined by the border of the skirt opposite the border to which the tube head is attached.

Once the tube has been filled, the opening is closed by welding the border of the skirt together.

A second technique consists of extruding a strip of plastics material having two longitudinal borders. The strip of plastics material is folded over on itself in such a way that the longitudinal borders overlap, and then the longitudinal borders are welded to each other to form a tubular preform. The preform is cut into cylindrical lengths. The cylindrical lengths are then used to form tube skirts.

Both of these techniques require that a tube head be overmoulded or welded onto a skirt, which requires handling operations to place the skirt in a mould or produce a weld.

Said handling makes the manufacturing method complex and prohibits the use of a continuous manufacturing method.

As a result, the production rate is limited, and is approximately 300 tubes per minute.

SUMMARY OF THE INVENTION

An aim of the invention is to propose a manufacturing method that permits continuous production of the tubes.

This aim is achieved according to the present invention by means of a tube manufacturing method comprising the steps of:
  enclosing a parison in a mould to form a blank having a first end portion shaped to form a first tube head, a tubular central portion, and a second end portion shaped to form a second tube head, and
  cutting the tubular central portion into a first skirt and a second skirt to obtain two separate tubes, namely a first tube including the first tube head and the first skirt, and a second tube including the second tube head and the second skirt.

The proposed method makes it possible to form two tubes in a single moulding operation and eliminates the operations consisting of moulding or adding the tube head to the skirt.

In the cutting step the two tubes are separated whilst creating an opening in each tube to allow the subsequent filling thereof.

The proposed manufacturing method can be implemented continuously.

In one implementation of the method, the mould comprises two mould halves, and the method comprises steps of:
  running the parison between the two mould halves, and
  bringing the two mould halves together to enclose the parison.

The method may also comprise a step of:
  moving a plurality of moulds along the parison, so that a first blank is extracted from a first mould while a second blank is being formed in a second mould.

In one implementation of the method, the first end portion and the second end portion of the blank are closed.

The method may comprise a step of:
  cutting the blank in the first or second end portion in such a way as to form a dispensing orifice in the first or second tube head.

The method may also comprise a step of:
  introducing compressed air into the parison when the parison is in the mould in order to press the parison against a wall of the mould in such as a way as to confer the shape of a blank on the parison.

The method may also comprise a step of:
  creating a partial vacuum inside the mould in order to press the parison against a wall of the mould in such as a way as to confer the shape of a blank on the parison.

The method may also comprise a step of:
  forming the parison by extrusion of a plastics material through an extruder head.

In particular, the parison can be formed by coextrusion of a plurality of layers of plastics materials.

One of said layers, particularly an intermediate layer, is a barrier layer, for example made from ethylene vinyl alcohol copolymer (EVOH).

The method may also comprise a step of:
  controlling the extruder head in such a way as to vary the flow rate of the extruded plastics material in order to vary the thickness of the parison.

The method may also comprise a step of:
  moving the first blank under the action of the second blank to a station for cutting said first blank. In other words, said blanks form a continuous strip until they are cut.

The invention also relates to a tube comprising:
  a tube head having a head wall defining a dispensing orifice, and
  a skirt having a skirt wall defining a storage cavity for a product,
wherein the head wall and the skirt wall are made up of a plurality of superimposed layers of plastics materials, each layer extending continuously from the head to the skirt.

One of said layers, particularly an intermediate layer, is a barrier layer, for example made from ethylene vinyl alcohol copolymer (EVOH).

Said tube also comprises an end opposite said tube head defined by the border of the skirt. Said end can be closed, particularly after said tube is filled, by bringing together and joining said border to itself. Said join can be produced by a welding step, for example. A tube with a non-planar base is thus obtained. In other words, before filling, the border of the skirt is free and the skirt is open on the side opposite the tube head. After filling, the skirt is closed along a contact strip formed by the joining together of two complementary segments of said border.

Said border can be obtained after cutting in two a blank obtained, for example, according to the method of the invention.

PRESENTATION OF THE DRAWINGS

Figure 2:
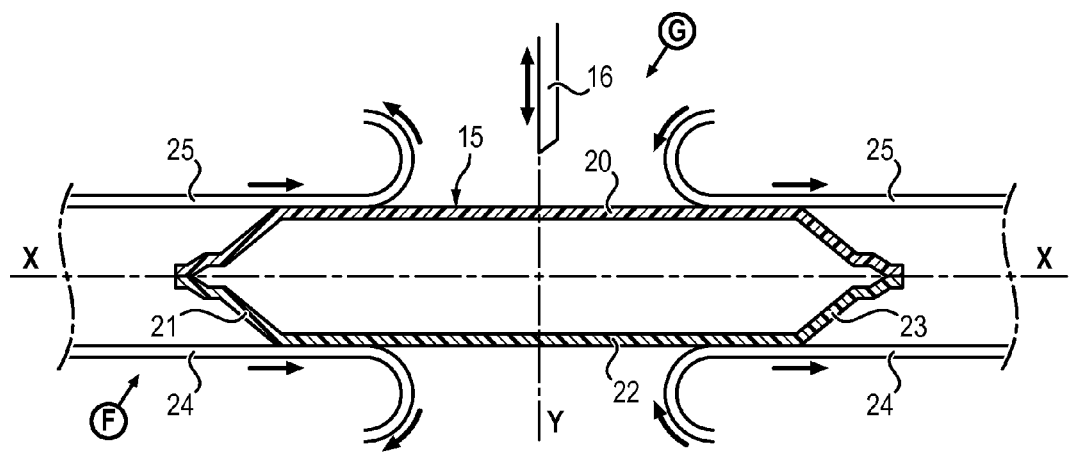
Figure 3:
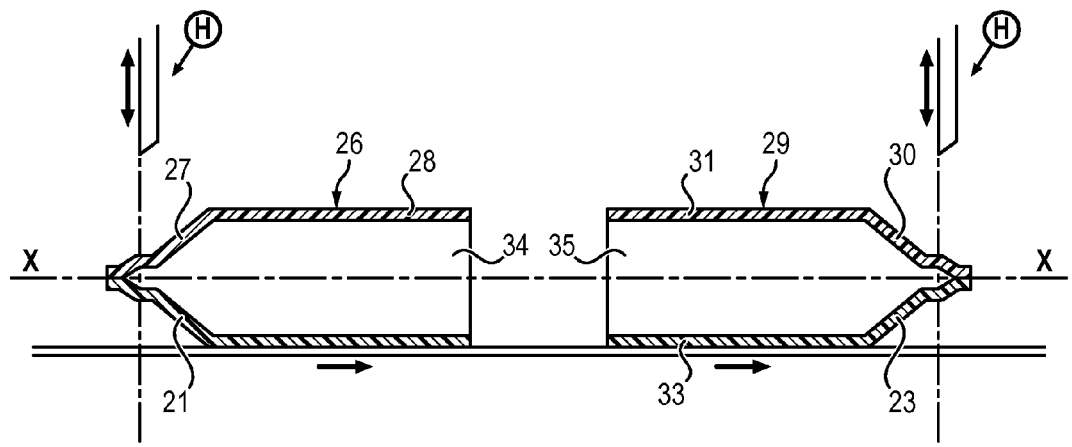

Further features and advantages will become apparent from the following description, which is given by way of purely illustrative, non-limiting example and with reference to the accompanying drawings, in which:

FIGS. 1 to 3 show diagrammatically the steps of a tube manufacturing method according to an implementation of the invention, FIGS. 4A, 4B and 4C show diagrammatically three tubes that can be obtained by said method.

DETAILED DESCRIPTION OF AN EMBODIMENT

The tube manufacturing method is implemented with a machine 1, the main parts of which are shown in FIGS. 1 to 3.

The machine 1 shown comprises an extruder head 2. The extruder head 2 comprises a die 3 having an extrusion orifice 4 of generally annular shape.

The machine 1 also comprises a plurality of moulds 6. Each mould 6 is made up of two mould halves 7 and 8. When they are brought together, the mould halves 7 and 8 define a closed moulding cavity 9 between them.

In addition, each mould half 7, 8 comprises a body 10 and a plurality of channels 11 made in the body 10, the channels 11 opening into the cavity 9 and being suitable for being connected to a vacuum pump (not shown).

The machine 1 also comprises two carrier strips 12 and 13 to which the mould halves 7 and 8 are respectively attached. The carrier strips 12 and 13 are endless loops. Each strip 12, 13 is suitable for being run along a closed trajectory (or cyclical trajectory). The simultaneous movement of the carrier strips 12 and 13 results in the mould halves 7 and 8 being run along respective cyclical trajectories.

The carrier strips 12 and 13 are arranged so that the mould halves 7 and 8 run in a moulding area 19 in a direction of travel X, in the same direction of travel (arrow I). When the mould halves 7 and 8 enter the moulding area 19, the mould halves 7 and 8 are brought close to each other, and then brought together to form the moulding cavity 9. When the mould halves 7 and 8 leave the moulding area, the mould halves are separated from each other. Thus, while they are running through the moulding area 19, the mould halves 7 and 8 are successively brought closer together and then moved away from each other.

The machine 1 also comprises two conveyor belts 24 and 25, and a cutting blade 16 arranged along the conveyor belts 24 and 25.

The tube manufacturing method takes place as follows.

According to a first step (A), a heated plastics material 5 is extruded from the extruder head 2. The pressurised heated plastics material 5 passes through the annular extrusion orifice 4 in such a way as to form a parison 14 of generally tubular shape.

The parison 14 is run in the first direction of travel X, and runs in the moulding area 19 between the mould halves 7 and the mould halves 8.

At the same time, according to a second step (B), the two carrier strips 12 and 13 are set in motion, in such a way as to carry the mould halves 7 and 8 parallel to the direction of travel X, in the same direction of travel as the parison 14.

According to a third step (C), the mould halves 7 and 8, when they enter the moulding area 19, are first brought closer to each other in such a way as to enclose the parison 14 in the mould 6.

According to a fourth step (D), slightly lower pressure is created inside the cavity 9 of the mould 6 by means of the vacuum pump. This slightly lower pressure has the effect of pressing the parison 14 against the walls of the mould halves 7 and 8 in such a way as to confer the shape of a blank 15 on the parison 14.

Alternatively, compressed air can be introduced into the parison 14 through a pipe 42 when the parison is in the mould 6 in order to press the parison 14 against the walls of the mould 6 in such as a way as to confer the shape of a blank on the parison.

According to a fifth step (E), the mould halves 7 and 8, when they leave the moulding area 19, are separated from each other in such a way as to release the blank 15.

The mould halves 7 and 8 are then carried by the carrier strips 12 and 13 to be recycled.

The movement of a plurality of moulds 6 along the parison 14 makes it possible to obtain a continuous manufacturing method, that is, a method wherein a blank 15 is extracted from a mould 6 while another blank 15 is being formed in the next mould 6.

The blank 15 thus formed consists of a closed envelope 20 made of a plastics material, having a symmetrical shape relative to a plane Y, perpendicular to the direction X. More precisely, the blank 15 comprises a first end portion 21 shaped to form a first tube head, a tubular central portion 22, and a second end portion 23 shaped to form a second tube head. The tubular central portion 22 has a transverse dimension greater than a transverse dimension of each of the end portions 21 and 23.

According to a sixth step (F), once it has cooled, the blank 15 is conveyed between the two conveyor belts 24 and 25 until it is facing the cutting blade 16.

According to a seventh step (G), the cutting blade 16 is moved perpendicular to the direction of travel X of the blank in such a way as to cut the blank 15 in the central tubular portion. More precisely, the blank 15 is cut into two symmetrical tubes:
- a first tube 26 including the first end portion 21 (which forms a first tube head 27) and a first part of the tubular central portion 22 (which forms the first tube skirt 28), and
- a second tube 29, symmetrical to the first tube 26, including the second end portion 23 (which forms a second tube head 30) and a second part of the tubular central portion 22 (which forms the second tube skirt 31).

The cutting step makes it possible to produce, from the blank 15 consisting of a closed envelope 20, two tubes 26, 29, each tube 26, 29 consisting of an open envelope 32, 33 having an opening 34, 35.

According to an eighth step (H), the first tube 26 is cut in the first end portion 21 in such a way as to form a first dispensing orifice 36 in the first tube head 27.

Similarly, the second tube 29 is cut in the second end portion 23 in such a way as to form a second dispensing orifice 37 in the second tube head 30.

In a variant of the method, the blank 15 can be formed by an envelope that is open at the dispensing orifices 36 and 37, so that step (H) is not necessary.

FIG. 4A shows a first example of a tube 26 obtained by the method described above. The tube 26 comprises a tube head 27 and a skirt 28 defining a storage cavity 38 for a product. The tube head 27 and the skirt 28 are made from a single piece of a plastics material.

The tube head 27 comprises a neck 47 having a dispensing orifice 36 and a shoulder 48 connecting the neck 47 to the skirt 28. The neck 47 has threads or ribs making it possible to secure a cap or dispenser cap to the tube head 27, in order to close the dispensing orifice 36.

It will be noted that it is possible, during the manufacturing method, to control the extruder head 2 in such a way as to vary the flow rate of the extruded plastics material 5 through the die 3 in order to vary the thickness of the parison 14, and thus obtain a wall of the tube head 27 that has a thickness identical to the thickness of a wall of the skirt 28.

FIG. 4B shows a second example of a tube 29 obtained by the method described above, but wherein the parison 14 is formed by coextrusion of two layers 40 and 41 of plastics materials.

As can be seen in FIG. 4B, the tube 29 obtained is identical to the tube 26 in FIG. 4A, with the exception that the wall of the head 30 and the wall of the skirt 31 are each made up of two layers 40 and 41 of superimposed plastics materials, each layer 40, 41 extending continuously from the head to the skirt.

The tube 29 comprises a tube head 30 having a dispensing orifice 37, and a skirt 31 defining a storage cavity 39 for a product. The tube head 30 and the skirt 31 are made up of two superimposed layers 40, 41 of plastics materials.

The outer layer 40 is for example made of polyethylene (PE), polypropylene (PP), polyethylene terephthalate (PET) or polystyrene (PS), while the inner layer 41 is for example made from ethylene vinyl alcohol copolymer (EVOH), polyamide (PA), polyethylene naphthalate (PEN), polyvinylidene fluoride (PVDF) or polyvinylidene chloride (PVDC). It is thus possible to obtain a tube 29 the inner layer 41 of which forms a barrier layer extending continuously from the head to the skirt.

It will be noted that it is possible to control the extruder head 2 in such a way as to vary the flow rates of each of the coextruded plastics materials in order to vary the thicknesses of the layers of the parison, and thus obtain layers 40, 41 of different thicknesses between the tube head and the skirt.

FIG. 4C shows a third example of a tube 43 obtained by the method described above, but wherein the parison 14 is formed by coextrusion of three layers 44, 45 and 46 of plastics materials.

As can be seen in FIG. 4C, the tube 43 obtained is identical to the tube 26 in FIG. 4A, with the exception that the wall of the head 30 and the wall of the skirt 31 are each made up of three layers 44, 45 and 46 of superimposed plastics materials, each layer 44, 45 and 46 extending continuously from the head to the skirt.

The tube 43 comprises a tube head 30 having a dispensing orifice 37, and a skirt 31 defining a storage cavity 39 for a product. The tube head 30 and the skirt 31 are made up of three superimposed layers 44, 45, 46 of plastics materials.

The outer layer 44 and the inner layer 46 are for example made of polyethylene (PE), polypropylene (PP), polyethylene terephthalate (PET) or polystyrene (PS).

The intermediate layer 45 arranged between the outer layer 44 and the inner layer 46 is for example made of ethylene vinyl alcohol copolymer (EVOH), polyamide (PA), polyethylene naphthalate (PEN), polyvinylidene fluoride (PVDF) or polyvinylidene chloride (PVDC).

In this case, the intermediate layer 45 forms a barrier layer extending continuously from the head to the skirt.

In addition, the three layers of plastics materials can be connected to each other by connecting layers, such as layers of ethylene and vinyl acetate copolymer (EVA), ethylene and methyl acrylate copolymer (EMA), ethylene and butyl acrylate copolymer (EBA), polyethylene-graft-maleic anhydride or ethylene-maleic anhydride and acrylate copolymer. The tube 43 thus comprises two connecting layers: a first connecting layer placed between the outer layer 44 and the intermediate layer 45 and a second connecting layer placed between the intermediate layer 45 and the inner layer 46.

The invention claimed is:

1. A tube manufacturing method comprising steps of:
enclosing a first portion of a parison in a first mould to form a first blank having a first end portion shaped to form a first tube head, a tubular central portion having a diameter, and a second end portion shaped to form a second tube head, wherein the first tube head and second tube head each comprise a neck having a diameter and a shoulder connecting the neck to the tubular central portion, wherein the diameter of the neck is smaller than the diameter of the tubular central portion;
enclosing a second portion of the parison in a second mould to form a second blank,
moving the first blank under the action of the second blank to a station for cutting said first blank, and
cutting the tubular central portion of the first blank into a first skirt and a second skirt to obtain two separate tubes, namely a first tube including the first tube head and the first skirt, and a second tube including the second tube head and the second skirt.

2. The method according to claim 1, wherein each mould comprises two mould halves, and comprising steps of:
running the parison between the two mould halves, and
bringing the two mould halves together to enclose the parison.

3. The method according to claim 1, comprising a step of:
moving a plurality of moulds along the parison, so that the first blank is extracted from the first mould while the second blank is being formed in the second mould.

4. The method according to claim 1, wherein the first end portion and the second end portion of the blank are closed.

5. The method according to claim 4, comprising a step of:
cutting the first blank in the first end portion or the second end portion in such a way as to form a dispensing orifice in the first tube head or in the second tube head.

6. The method according to claim 1, comprising a step of:
introducing compressed air inside the parison when the parison is in each mould in order to press the parison against a wall of each mould in such as a way as to confer the shape of the blank on the parison.

7. The method according to claim 1, comprising a step of:
creating a partial vacuum inside each mould in order to press the parison against a wall of the mould in such as a way as to confer the shape of the blank on the parison.

8. The method according to claim 1, comprising a step of:
forming the parison by extrusion of a plastics material through an extruder head.

9. The method according to claim 8, wherein the parison is formed by coextrusion of a plurality of layers of plastics materials.

10. The method according to claim 8, comprising a step of:
   controlling the extruder head in such a way as to vary the flow rate of the extruded plastics material in order to vary the thickness of the parison.

11. The method according to claim 2, comprising a step of:
   moving a plurality of moulds along the parison, so that the first blank is extracted from the first mould while the second blank is being formed in the second mould.

12. The method according to claim 9, comprising a step of:
   controlling the extruder head in such a way as to vary the flow rate of the extruded plastics material in order to vary the thickness of the parison.

* * * * *